April 11, 1967     C. U. DEATON     3,313,932
LIGHT RAY BAFFLE CONSTRUCTION

Filed Aug. 13, 1964     8 Sheets-Sheet 1

INVENTOR.
CHARLES U. DEATON
BY
ATTORNEY

April 11, 1967 C. U. DEATON 3,313,932
LIGHT RAY BAFFLE CONSTRUCTION
Filed Aug. 13, 1964 8 Sheets-Sheet 2

INVENTOR.
CHARLES U. DEATON
BY
ATTORNEY

April 11, 1967  C. U. DEATON  3,313,932
LIGHT RAY BAFFLE CONSTRUCTION
Filed Aug. 13, 1964  8 Sheets-Sheet 3
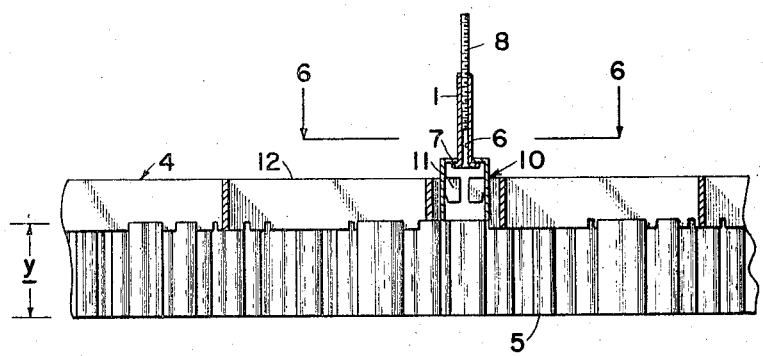
FIG. 5
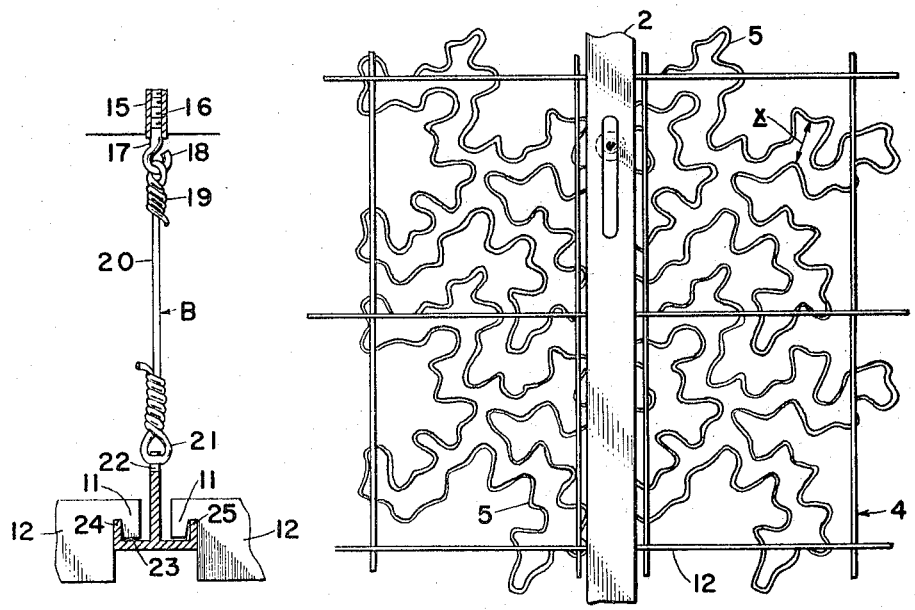
FIG. 8
FIG. 6
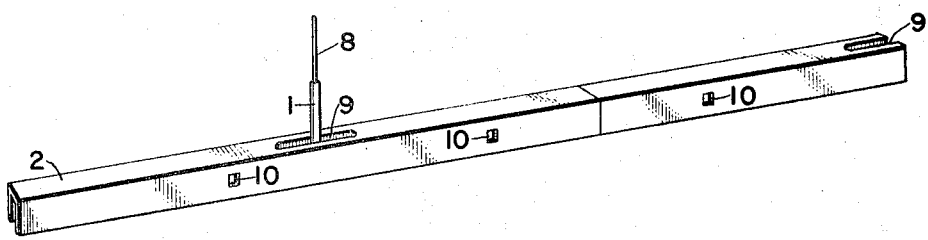
FIG. 7
INVENTOR.
CHARLES U. DEATON
BY
ATTORNEY

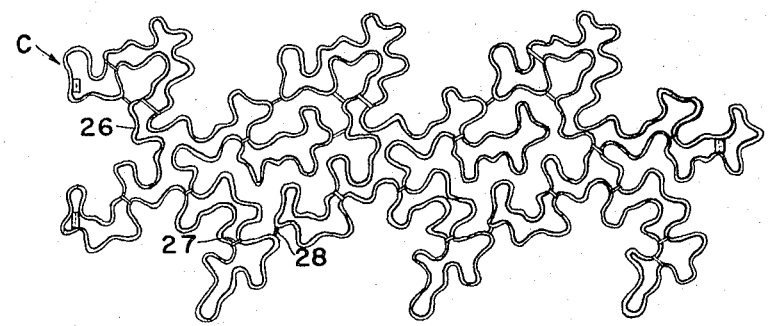
FIG. 9
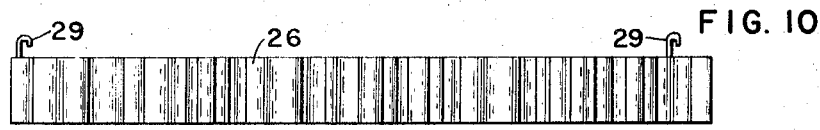
FIG. 10
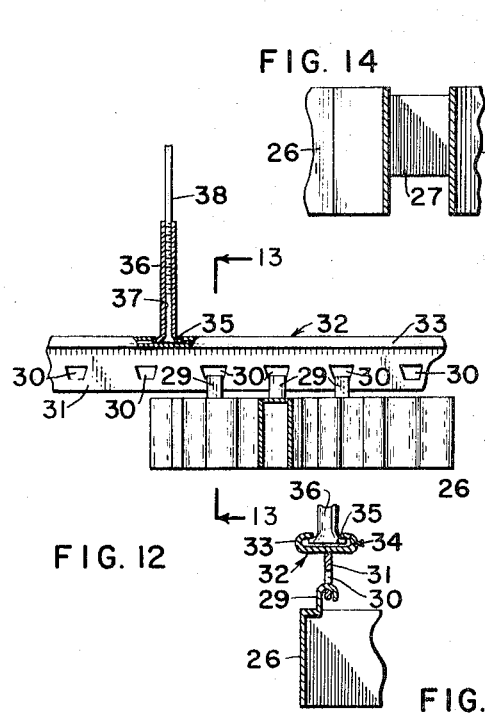
FIG. 14
FIG. 12
FIG. 13
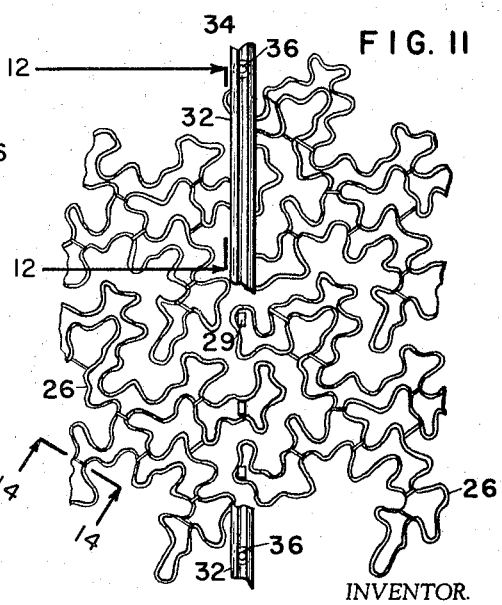
FIG. 11
INVENTOR.
CHARLES U. DEATON
BY
ATTORNEY April 11, 1967    C. U. DEATON    3,313,932
LIGHT RAY BAFFLE CONSTRUCTION
Filed Aug. 13, 1964    8 Sheets-Sheet 5
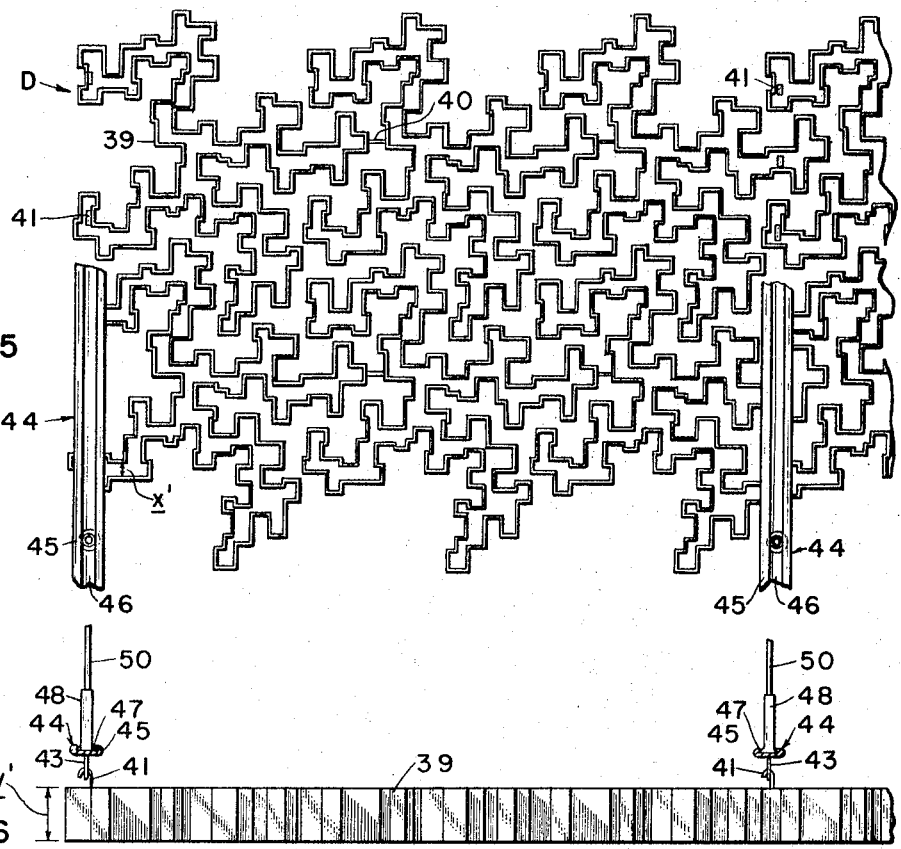
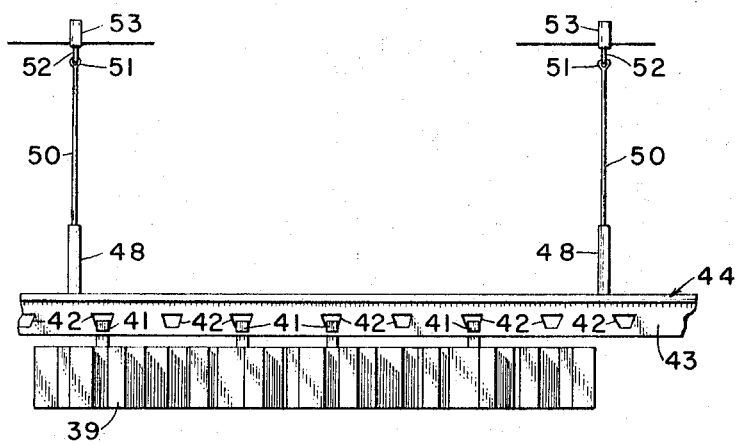
INVENTOR.
CHARLES U. DEATON
BY
ATTORNEY April 11, 1967 C. U. DEATON 3,313,932
LIGHT RAY BAFFLE CONSTRUCTION
Filed Aug. 13, 1964 8 Sheets-Sheet 6
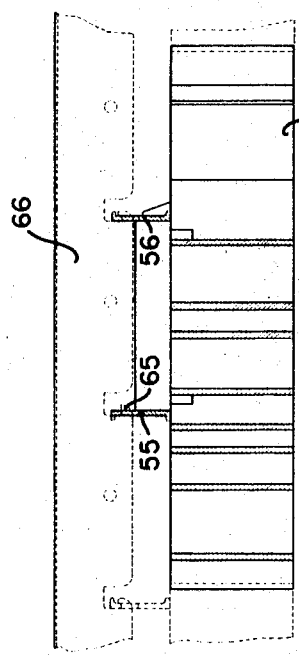
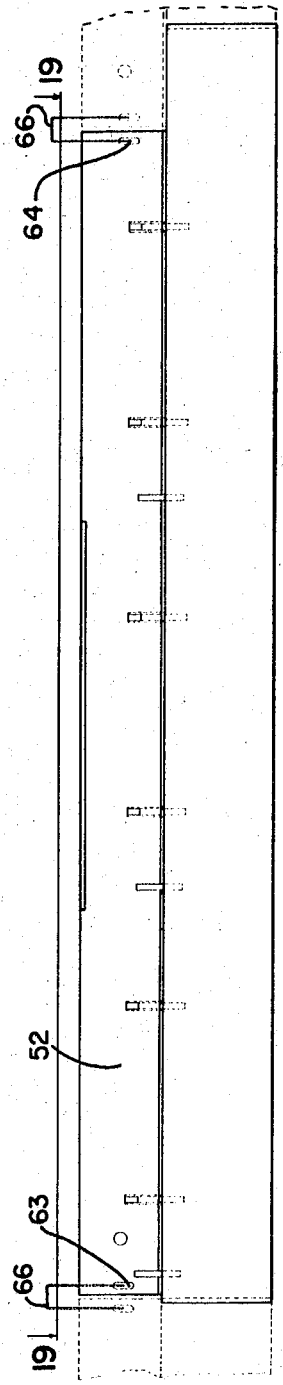
INVENTOR.
CHARLES U. DEATON
BY Alfred W. Petchaft
ATTORNEY INVENTOR.
CHARLES U. DEATON
BY Alfred V. Petchaft
ATTORNEY

INVENTOR.
CHARLES U. DEATON

United States Patent Office 3,313,932
Patented Apr. 11, 1967

3,313,932
LIGHT RAY BAFFLE CONSTRUCTION
Charles U. Deaton, Genessee Mountain, Rte. 3,
Golden, Colo. 80401
Filed Aug. 13, 1964, Ser. No. 389,332
17 Claims. (Cl. 240—78)

This invention relates in general to certain new and useful improvements in light ray baffle constructions and, more particularly, to certain unique grid-like devices or so-called cells adapted for efficiently transmitting light while at the same time effectively masking a light source from direct view.

Light ray baffles are used in conjunction with various types of light sources either across the bottom of individual lighting fixtures or across the bottom of an array of lighting fixtures. They are intended to cause a uniform dispersion of the light rays. Conventional structures of this type are usually of the egg-crate or cell type in which the thin vertical elements are tightly interlocked, thereby forming a rectilinear arrangement which is useful in baffling light. Moreover, such structures are repetitively geometric in appearance and, therefore, are rather commonplace and unartistic from the aesthetic viewpoint.

It is, therefore, the primary object of the present invention to provide a light ray baffle which is optically efficient.

It is a further object of the present invention to provide a unique type of light ray baffle which can be rapidly and economically assembled, and can be universally adapted to ceilings of any shape or size at minimum expense.

It is another object of the present invention to provide a unique type of light ray baffle which, in assembled form, presents a random-pattern which has a highly pleasing appearance and achieves a random-intensity of light distribution which is optically comfortable for persons using the space thus illuminated.

It is still another object of the present invention to provide a unique and novel means for securely mounting individual baffle-elements to form a unitary structure.

It is a further object of the present invention to provide baffle-elements by which light is efficiently diffused.

With the above and other objects in view, my invention resides in the novel features of form, construction, arrangement, and combination of parts presently described and pointed out in the claims.

In the accompanying drawings:

FIG. 5 is a sectional view taken along line 5—5 of FIG. 2;

FIG. 6 is a sectional view taken along line 6—6 of FIG. 5;

FIG. 7 is a fragmentary perspective view of a support channel forming a part of the present invention;

FIG. 8 is a fragmentary vertical sectional view of a modified form of support structure constructed in accordance with and embodying the present invention;

FIG. 9 is a top plan view of a modified form of baffle-element constructed in accordance with and embodying the present invention;

FIG. 10 is a side elevational view of the modified form of baffle-element shown in FIG. 9;

FIG. 11 is a fragmentary top plan view of the modified form of baffle-element shown in FIG. 9 assembled upon a support channel;

FIG. 12 is a fragmentary sectional view taken along line 12—12 of FIG. 11;

FIG. 13 is a fragmentary sectional view taken along line 13—13 of FIG. 12;

FIG. 14 is a fragmentary sectional view taken along line 14—14 of FIG. 11;

FIG. 15 is a fragmentary top plan view of another modified form of baffle-element constructed in accordance with and embodying the present invention;

FIG. 16 is a fragmentary side elevational view of the baffle-element shown in FIG. 15;

FIG. 17 is a fragmentary sectional view taken along line 17—17 of FIG. 15;

FIG. 18 is a side elevational view of a further modified form of baffle-element constructed in accordance with and embodying the present invention;

FIG. 20 is a transverse sectional view taken along line 20—20 of FIG. 19; and

Figure 1:
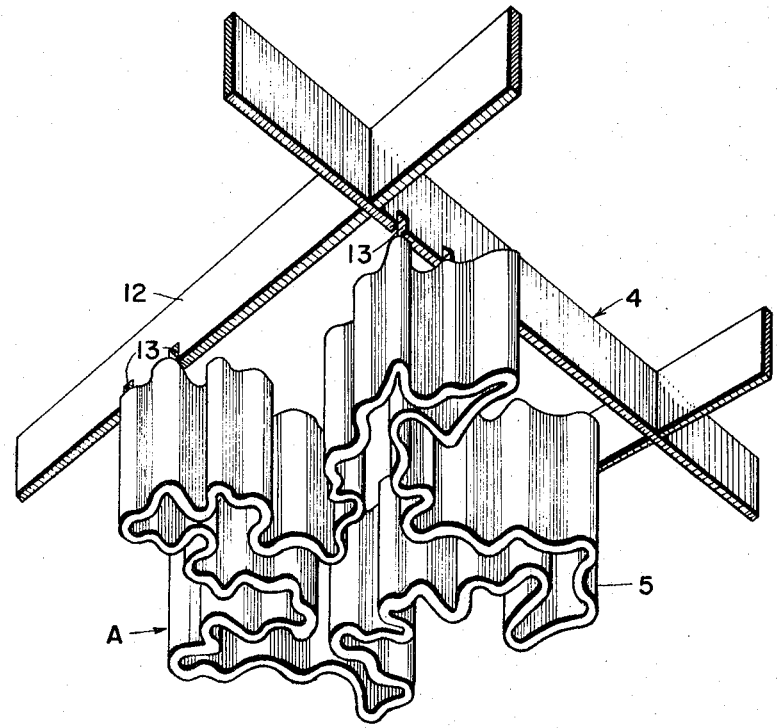
FIG. 1 is a fragmentary perspective view of a single baffle-unit mounted on support members and constructed in accordance with and embodying the present invention.
Figure 2:
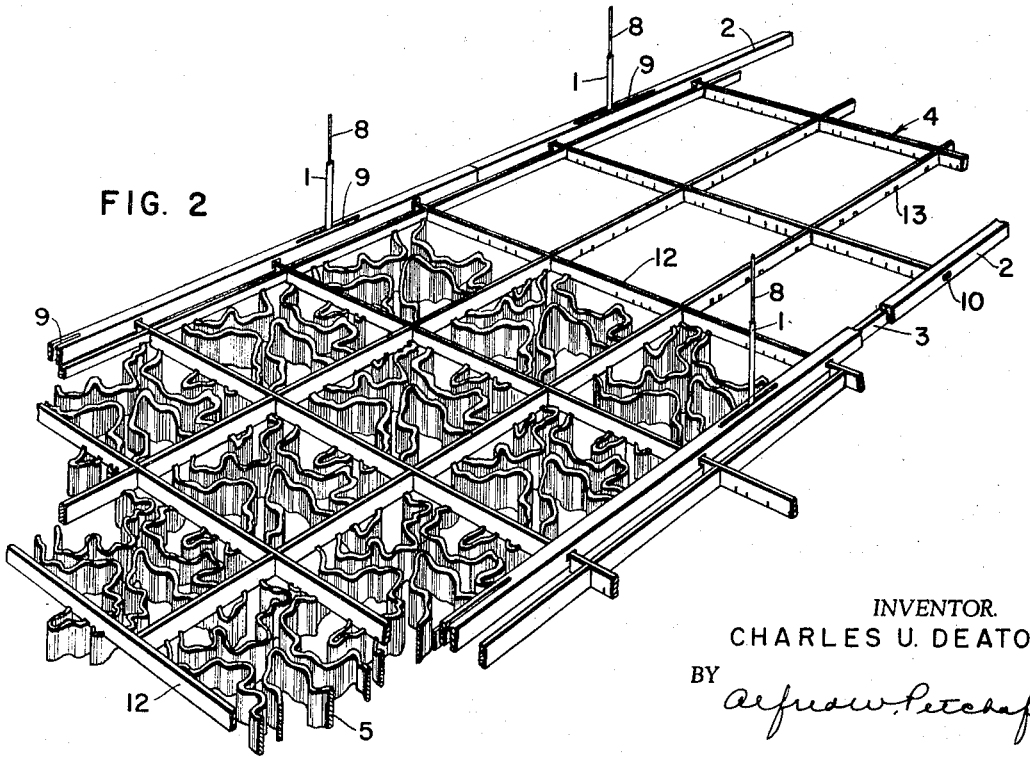
FIG. 2 is a fragmentary perspective view of a plurality of the baffle-units mounted on support members which are, in turn, mounted on support channels, thereby forming a light ray baffle constructed in accordance with and embodying the present invention.
Figure 3:
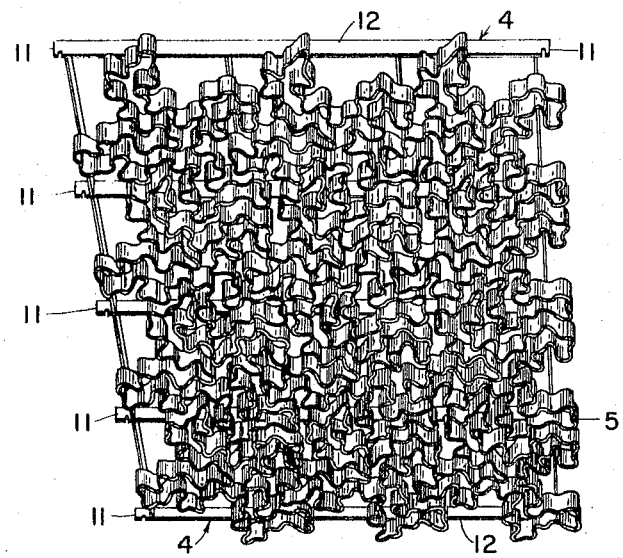
FIG. 3 is a perspective view of baffle-element constructed in accordance with and embodying the present invention, as viewed from the bottom side.
Figure 4:
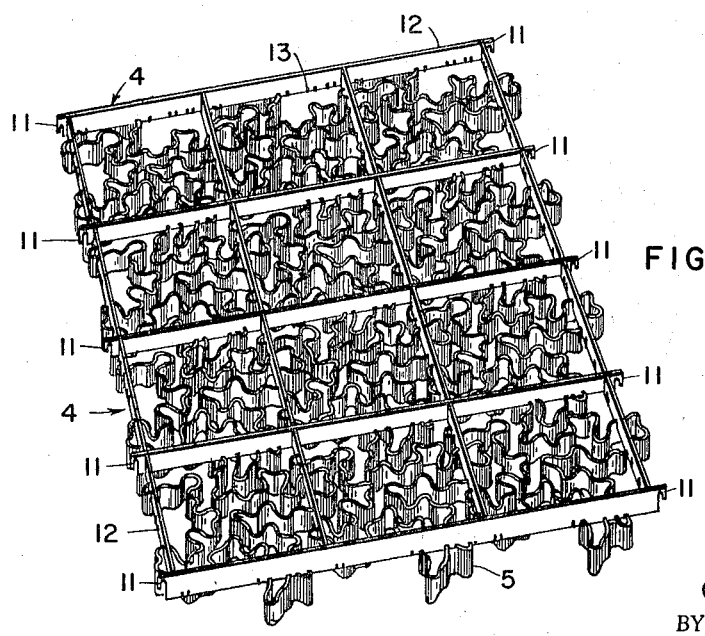
FIG. 4 is a perspective view of a baffle-element constructed in accordance with and embodying the present invention, as viewed from the top side.
Figure 19:
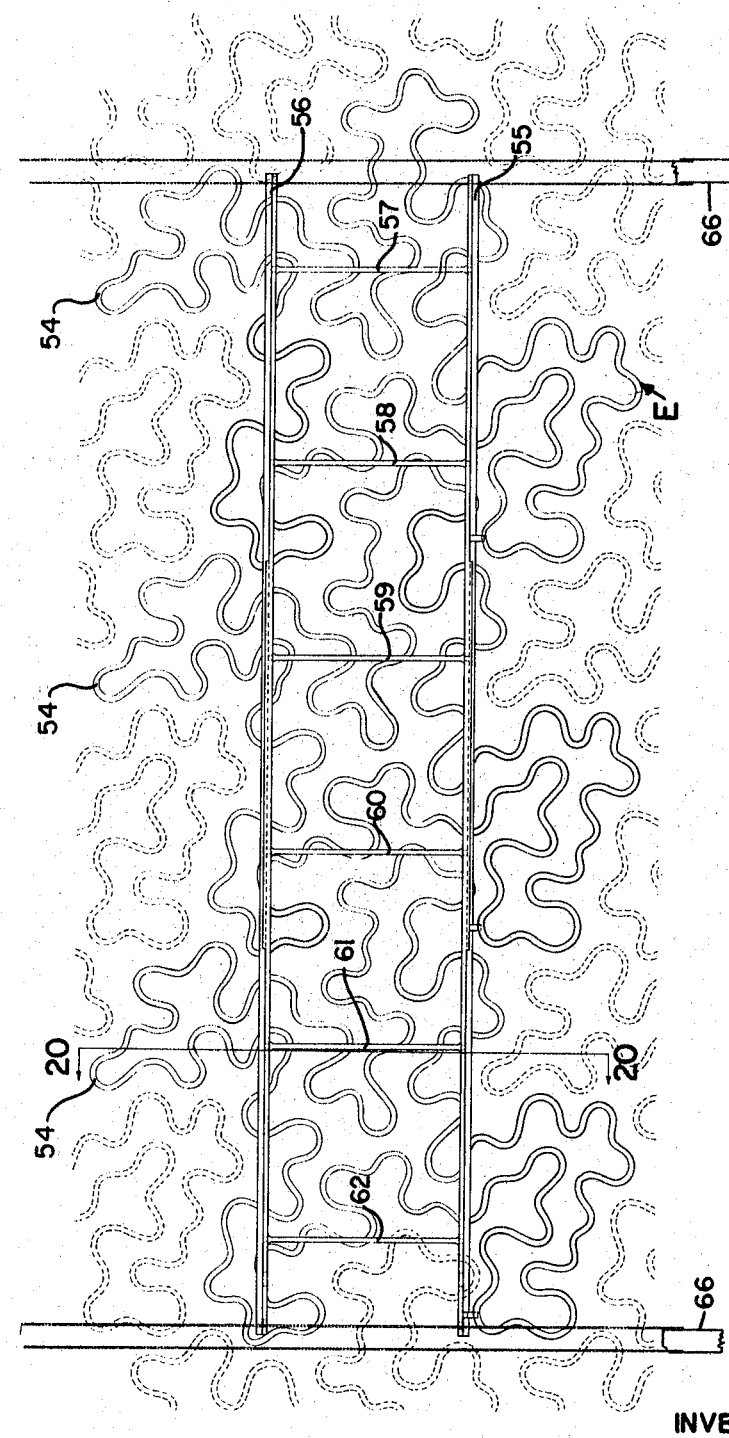
FIG. 19 is a horizontal sectional view taken along line 19—19 of FIG. 18.
Figure 21:
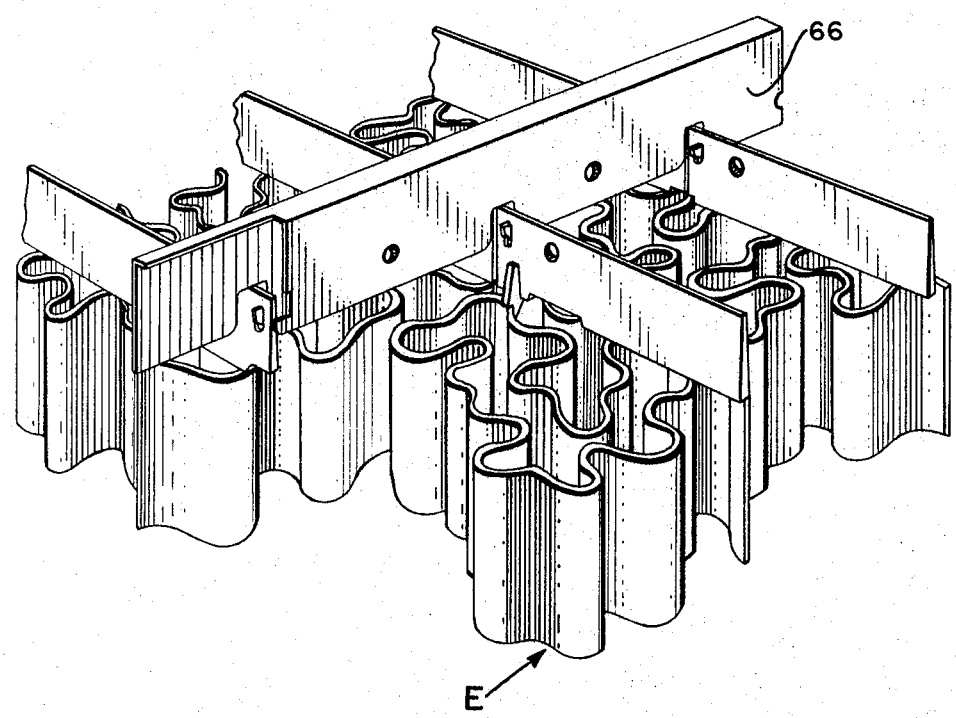
FIG. 21 is a fragmentary perspective view of the baffle shown in FIGS. 18 to 20, inclusive.

Referring now in more detail and by reference characters to the drawings which illustrate practical embodiments of the present invention, A designates a light ray baffle-element or assembly comprising a plurality of hanger sleeves 1, U-shaped main channels 2, U-shaped channel-connectors 3, baffle-grids 4, and baffle-units 5, all as best seen in FIG. 2.

The hanger sleeves 1 have internally threaded bores 6 and are provided at their lower ends with diametrally enlarged heads 7. The internally threaded bores 6 are of such a size as to accommodate externally threaded hanger rods 8 which are secured to the ceiling or other suitable portions of a room by any conventional means (not shown). The main channels 2 are provided with elongated slots 9, as can be seen in FIGS. 2 and 7, in order to accommodate the hanger sleeves 1 that extend upwardly through said slots 9, and are retained in that position by the enlarged heads 7, which abut the bight portion of the channels 2. As may be seen from FIG. 2, a plurality of the channels 2 are connected in endwise aligned runs by means of the U-shaped channel-connectors 3 press-fitted thereover and a plurality of such runs are disposed in spaced parallel arrangement. Each of the side legs of the main channels 2 are provided with a plurality of small square apertures 10 which are adapted to engage the hook-like ends 11 of the baffle-grids 4, as shown in FIG. 5.

Each of the baffle-grids 4 comprises a plurality of straight strips 12 interconnected in the manner of an egg-crate and provided along their lower margins with a plurality of notches 13, which are so positioned and are of such a width so that when peened or upset, they will retain the baffle-units 5 that are inserted thereinto. Each of the baffle-units 5 is formed of a continuous or endless strip of relatively thin material which is of substantially irregular or sinuous contour branching out from a central point in a more or less radial manner so that directly opposed areas of the interior surface are close together in a horizontal direction relative to the vertical width of the strip. In other words, the horizontal direction, which is designated in FIG. 6 by reference letter x, varies from point-to-point around the interior of the baffle-unit 5, but this dimension, for the most part, is smaller than the vertical width of the strip indicated by the reference letter y in FIG. 5. Moreover, the internal shape of the convolutions on one side of a particular baffle-unit 5 are complementary to the external shape of the convolutions on the other side of the baffle-unit 5 so that when two identical baffle-units 5 are mounted in proximate relation within a baffle-grid 4, they will fit one within the other in the manner shown in FIG. 6 and the individuality or visually discernible identity of each baffle-unit 5 becomes "lost" or merged in the overall random-pattern. Consequently, when a plurality of baffle-units 5 are assembled to form a completed baffle-element, the overall visual effect will be that of a random-pattern of highly artistic and aesthetically pleasing design. Each baffle-unit is inserted edgewise into the notches 13 for a short distance and the notches 13 are mechanically squeezed or peened into retentive engagement therewith so that the baffle-units 5 will thus be permanently affixed to, and depend from, the downwardly presented horizontal plane of the baffle-grids 4. It should also be noted in this connection that the vertical width y of the baffle-units 5 is substantially greater than the vertical width of the strips forming the baffle-grids 4, the latter being only of such size, shape, and strength as to afford structural support for the baffle-units 5. Moreover, the channels 2 more be transversely spaced at distances approximately equal to the width of the assembled baffle-elements. In other words, the channels 2 are arranged so that each square aperture 10 is transversely aligned with a comparable aperture 10 in the next adjacent parallel channel 2 and the distances between such apertures 10 are substantially equal to the distances between the opposite hook-like ends 11 of a single grid-forming strip. Thus, each baffle-grid 4 and its associated baffle-units 5 may be simply and easily removed or inserted, as a unit, in the channels 2 by simply engaging or disengaging the hook-like ends 11. The entire structure may also be leveled or adjusted as to height by merely screwing the hanger sleeves 1 either up or down on the threaded hanger rods 8, since the heads 7 are free to rotate against the bight portions of the channels 2.

It is possible to provide a modified form of baffle-supporting structure B, substantially as shown in FIG. 8, but which comprises a tubular member 15 that is secured to a ceiling or other portion of a room and which has an internally threaded bore 16. The bore 16 is adapted to receive an exteriorly threaded hook-like member 17 that has a downwardly extending hook 18. Secured to the hook 18 is a loop 19 that forms the upper end of a section of wire 20. The section of wire 20 has a lower loop 21 which extends through an aperture 22 formed in an inverted T-shaped channel 23. The T-shaped channel 23 has two upwardly extending ends 24, 25, which are adapted to engage the hook-like ends 11, as shown in FIG. 8.

It is also possible to provide a modified form of light ray baffle-element or assembly C, as shown in FIGS. 9–11, in which baffle-units 26 of the same general configuration as the previously described baffle-units 5 are secured to each other by spacers 27 which are spot-welded or otherwise suitably secured thereto. In addition, flat support members 28 are spot-welded between various points within a single baffle-unit 26, thus rendering the baffle-units 26 entirely self-supporting and eliminating the need for baffle-grids 4. As can be seen in FIGS. 9 and 10, the baffle-units 26 are provided with hooks 29 which are adapted to engage apertures 30 formed in the side of a vertical channel 31. At its upper end, the vertical channel 31 is secured to a horizontal channel 32 which has two arcuately shaped sides 33 that partially enclose the upper face of the horizontal channel 32 and thus form an elongated slot 34. An enlarged head 35 integrally formed on a tubular member 36 is slidably inserted in the elongated slot 34. The tubular member 36, in addition, has a threaded internal bore 37 that is adapted to retain an externally threaded support rod 38 which is secured to the ceiling or other suitable portion of the room. It can thus be seen that the modified light ray baffle-element or assembly C does not require the U-shaped channel-connectors 3 and the baffle-grids 4 which were used in the light ray baffle-assembly A. In addition, it should be noted that the baffle-units 26 which are secured together can be quickly and easily removed from the vertical channel 31 by simply disengaging the hooks 29 from the apertures 30.

It is also possible to provide a modified form of light ray baffle-element or assembly D, as shown in FIGS. 15–17, which is similar to the modified light ray baffle-element or assembly C, but in which the baffle-units 39 follow straightline pattern, but are similar in optical principle to the previously described baffle-units 5. In other words, each one of the baffle-units 39 is constructed of an endless strip which follows a series of outwardly radiating contours so that the interior surface is bent back upon itself into more or less closely folded juxtaposition. Thus, the horizontal perpendicular distance $x'$ between any two opposed areas of such interior surface is, for the most part, smaller than the vertical width $y'$ of the strip. Moreover, the continuously convoluted pattern of each of the baffle-units 39 is such that one baffle-unit can be internested in spaced relation within any one of the other baffle-units 39, whereby the horizontal perpendicular distance between the proximate exterior surfaces of two such internested baffle-units 39 will be more or less of the same general pattern as the range of variations of the distance $x$ of the interior of any one of such baffle-units 39. As in the case of the previously described baffle-unit 5, the resulting visual effect is that of a random-pattern which is seemingly without beginning or end. By referring to FIGS. 15–17, it can be seen that the baffle-units 39 are secured to each other by flat metallic connecting members 40 which are spot-welded or otherwise suitably secured to the baffle-units 39. By referring to FIG. 15, it can be seen that only the baffle-units 39 which are located at the extremities of the modified light ray baffle-element or assembly D are provided with hooks 41 which are adapted for insertion within apertures 42 located in the vertical channels 43. The vertical channels 43 are secured to a horizontal channel 44 which has arcuately shaped sides 45 that partially enclose the upper face of the horizontal channel 44 to form an elongated slot 46. Adapted for removable insertion within the elongated slot 46 is an enlarged head 47 which is integrally formed on the bottom of a tubular support member 48 having an internally threaded bore 49. Adapted for insertion within the bore 49 is an externally threaded rod 50, which terminates at its upper end in a loop 51 which is secured to a hook 52 that forms the lower portion of a member 53 which is embedded in a ceiling. It can thus be seen that the light ray baffle-element D is similar to the light ray baffle-element C in that U-shaped channel-connectors 3 and baffle-grids 4, as used in the light ray baffle-element A, are not necessary.

Referring now to FIGS. 18–21, it is also possible to provide a further modified form of light ray baffle-element or assembly E that is similar to the light ray baffle-element or assembly A, but which comprises a plurality of identical baffle-units 54 similar in optical principle to the previously described baffle-units 5. Preferably three internested baffle-units 54 are arranged lengthwise along a supporting grid consisting of two longitudinal rails 55, 56, cross-connected by transverse ribs 57, 58, 59, 60, 61, 62. The continuously convoluted pattern of each of the baffle-units 54 is such that one baffle-unit 54 can be internested in spaced relation relation within the end portion or side portions of the other baffle-units 54, as shown in dotted lines in FIG. 19, whereby the horizontal perpendicular distance between the proximate exterior surfaces of two such internested baffle-units 54 will be more or less of the same general pattern. As in the case of the previously described baffle-unit 5, the resulting visual effect is that of a completely random-pattern which is seemingly without beginning or end. The baffle-units 54 are preferably molded of a synthetic resin and may be adhesively secured to flat metallic connecting rails 55, 56, and ribs 57, 58, 59, 60, 61, 62, or the entire grid and assembly E may be molded as a unit. By referring to FIG. 18, it can be seen that the rails 55, 56, are provided with apertures 63, 64, which are adapted for engagement with hook-like elements 65 located in horizontal channels 66 which are, in turn, suspended from the permanent ceiling in the manner previously described. It can thus be seen that the light ray baffle-element E is similar to the light ray baffle-element A in that a number of them can be quickly hooked in place to form an overall ceiling grid which can be readily taken down and put back in place for periodic cleaning.

It will, therefore, be evident that light ray baffle-elements constructed according to the present invention are readily adaptable for a variety of lighting installations, ranging from single light-units to entire ceilings, by merely placing the basic light ray baffle-elements or assemblies in edgewise relation to each other. In addition, the grids or other sub-assemblies can be quickly and conveniently removed, thus facilitating cleaning. Although each of the present baffle-elements was described as being one which depended from the ceiling, it is understood that the same elements readily lend themselves for use in front of a vertical window or in any other required vertical plane. The baffle-elements can also be used as a window screen exteriorly of a building to prevent undesired sunlight from hitting the building from certain angles and affecting the furnishings and personnel therein.

It should be understood that changes and modifications in the form, construction, arrangement, and combination of the several parts of the light ray baffle construction may be made and substituted for those herein shown and described without departing from the nature and principle of my invention.

Having thus described my invention, what I claim and desire to secure by Letters Patent is:

1. A light ray baffle adapted to mask a light source; said baffle comprising support means, and a plurality of baffle-units of irregular and random shape, each formed by a continuous endless ribbon-like piece of solid material, said baffle-units being secured to and projecting outwardly from the support means whereby to mask the support means and light source, adjacent baffle-units being disposed in spaced internested relation so as to form an overall foraminous random pattern which is seemingly without beginning or end.

2. A light ray baffle adapted to mask a light source; said baffle comprising support means, and a plurality of laterally internested baffle-units secured to the support means and projecting outwardly therefrom so as to mask the support means and light source, each of said baffle-units being formed from a continuous endless ribbon-like piece of solid material of irregular and random shape which branches out from a central point so that opposed areas of the interior surfaces are close together to form an overall random pattern which is seemingly without beginning or end.

3. A light ray baffle comprising a supporting grid having a plurality of straight members which are rectilinearly interconnected to form a series of open cells, and a plurality of irregularly shaped baffle-units mounted upon and projecting outwardly from the face of the grid for a substantial distance to mask the grid and light source, each baffle-unit being formed from a continuous endless ribbon-like strip of solid material of irregular and random shape which branches out from a central point so that the opposed areas of the interior surfaces of the ribbon-like material are close together, adjacent baffle-units being disposed in spaced internested relation so that the juxtaposed exterior faces of adjacent baffle-units are close together to form an overall foraminous random pattern which is seemingly without beginning or end.

4. A light ray baffle according to claim 3 in which the endless strips are attached edgewise to and project outwardly from the supporting grid.

5. A light ray baffle according to claim 3 in which the straight members are provided with a plurality of outwardly opening slits at the junctures of the ribbon-like strips forming the baffle-units, the strips being fitted into the slits and retentively engaged by the margins of the slits.

6. A light ray baffle according to claim 3 in which the grid is provided with hook-like elements adapted for readily disengageable connection with the framework.

7. A light ray baffle according to claim 3 in which the framework is supported in depending position from an elevated structure by threaded hanger rods and threaded elements adjustably mounted on the hanger rods.

8. A light ray baffle according to claim 3 in which a single baffle-unit extends entirely across and substantially masks a single cell.

9. A light ray baffle according to claim 8 in which a single baffle-unit extends across and substantially masks a single cell.

10. A light ray baffle comprising a supporting framework consisting of a plurality of straight members which are rectilinearly interconnected to form a series of open cells and a plurality of baffle-units mounted upon and extending across one face of the framework, said baffle-units being formed of a plurality of irregularly and randomly shaped endless strips attached edgewise to and projecting outwardly from the supporting framework to mask the framework, said strips being formed in a closed serpentine shape having a series of indentations of such configurtion that one baffle-unit can fit partially within, and extend laterally away from, adjacent baffle-units in a maze-like random pattern which is seemingly without beginning or end.

11. A light ray baffle according to claim 10 in which the serpentine shape of the baffle-units is of arcuate contour.

12. A light ray baffle according to claim 10 in which the serpentine shape of the baffle-units is of rectilinear contour.

13. A light ray baffle according to claim 10 in which the solid material is metal.

14. A light ray baffle according to claim 10 in which the solid material is synthetic resin.

15. A light ray baffle comprising a grid consisting of a plurality of straight members which are rectilinearly interconnected to form a series of open cells and a plurality of baffle-units mounted upon and extending across one face of the framework, said baffle-units consisting of a plurality of irregularly shaped endless strips formed of synthetic resin attached edgewise to and projecting outwardly from the grid so as to mask the framework, said strips being formed in a closed serpentine shape having a series of radiating indentations of irregular and seemingly random shape and of such configuration that one baffle-unit can fit partially within and extend laterally away from adjacent baffle units in a maze-like pattern.

16. A light ray baffle according to claim 15 in which the grid is provided with hook-like elements adapted for readily disengageable connection with a supporting framework.

17. A light ray baffle comprising a grid consisting of a plurality of straight members which are rectilinearly interconnected to form a series of open cells and a plurality of baffle-units mounted upon and extending across one face of the framework, said baffle-units consisting of a plurality of irregularly and randomly shaped endless strips formed of synthetic resin attached edgewise to and projecting outwardly from the grid so as to mask the framework, said strips being formed in a closed serpentine shape having a series of radiating indentations of such configuration that one baffle-unit can fit in spaced relation partially within the indentations of and extend laterally away from adjacent baffle-units in a maze-like pattern.

References Cited by the Examiner

UNITED STATES PATENTS

| | | | |
|---|---|---|---|
| 261,282 | 7/1882 | Vedder | 52—663 |
| 2,756,325 | 7/1956 | Zwick | 240—78 |
| 2,825,800 | 3/1958 | Spott | 240—78 |
| 2,958,761 | 11/1960 | Wakefield | 240—9 |
| 3,006,019 | 10/1961 | Deaton | 240—9 X |

FOREIGN PATENTS 937,839  9/1963  Great Britain.

NORTON ANSHER, *Primary Examiner.*

C. C. LOGAN II, *Assistant Examiner.*